Oct. 28, 1969   J. E. WOOD ET AL   3,474,922
GEAR REDUCTION UNIT FOR A BOAT TRAILER
Filed Dec. 5, 1967   4 Sheets-Sheet 1

INVENTORS.
JACK E. WOOD &
HOWARD G. LIVERANCE
BY *Bosworth, Sessions,*
*Herrstrom & Cain*
ATTORNEYS United States Patent Office 3,474,922
Patented Oct. 28, 1969

3,474,922
GEAR REDUCTION UNIT FOR A BOAT TRAILER
Jack E. Wood, 7338 Rawsonville Road, Belleville, Mich. 48111, and Howard G. Liverance, 13149 Sycamore St., Southgate, Mich. 48192
Filed Dec. 5, 1967, Ser. No. 688,194
Int. Cl. B60p *1/00, 1/64*
U.S. Cl. 214—85.5                                        1 Claim

ABSTRACT OF THE DISCLOSURE

A power winch mechanism for a boat trailer and a gear reduction unit thereof. The unit in its simplest form requires only one or more planetary gears mounted on a planet carrier connected to the prime mover, a fixed internal ring gear and a driven internal ring gear connected to the rotary load such as the rope drum of a winch mechanism.

BACKGROUND OF THE INVENTION

This invention relates to gear reduction and especially to extremely high gear ratio type gear reduction such as is required for rope drums in motor driven winches. More particularly the invention relates to a gear reduction unit having an exceptionally high gear ratio as well as compact size, for use in connection with relatively low horsepower motors with high operating speeds.

Gear reduction units having very high gear ratios—say greater than 15:1—have in the past been of relatively complicated design and of considerable size and weight due to the complex geometry. The necessary machining of the gear teeth to close tolerances has been quite costly and accordingly certain types of mechanical equipment requiring such reduction units for accomplishing relatively common tasks have been extremely expensive. A practical example is the case of winches for small boat trailers. Manual winches have been widely used in the past because the cost of the required gear reduction made a direct current, electric motor driven winch impractical. Since a direct current electric motor of the size and rating to do the job (say between ⅓ and ¾ horsepower) normally has an optimum speed of around 1800 r.p.m., and since a suitable speed for a rope drum having for example a 2 inch diameter would be around 60 r.p.m., a gear reduction of at least 30:1 is needed. Gear reduction units of this capability that are commercially available however, are quite complex and costly even though in this type of application precise geometry is not essential.

The gear reduction unit of the present invention however satisfies the problems indicated above and affords other features and advantages not obtainable from the prior art.

SUMMARY OF THE INVENTION

It is among the objects of the invention to simplify the reduction gearing between a rotary prime mover and a rotary load with gear ratios greater than 15:1.

Another object is to provide an improved low-cost gear reduction unit which eliminates machining of gear teeth.

Still another object is to reduce the complexity of the gear geometry and the cost of manufacture of high gear ratio type gear reduction units.

These and other objects and advantages are realized through a power winch mechanism for a boat trailer, the winch having a rope drum which turns to pull a floating boat onto the bed of the trailer. The winch mechanism has a gear reduction unit including a planet carrier connected to a rotary prime mover and having two planetary gears, a fixed internal ring gear which is in mesh with each planetary gear and another internal ring gear or driven gear connected to the rope drum and also in mesh with each planetary gear. The ratio of gear teeth of the fixed ring gear to the meshing gear teeth of each planetary gear is different than the ratio of gear teeth of the driven ring gear to the meshing gear teeth of each planetary gear so that the driven gear turns through a small arc during each rotation of the planet carrier.

According to one embodiment, two planetary gears are used and the driven output ring gear has one less tooth than the fixed ring gear. The difference in geometry between the two ring gears or in other words the unequal spacing of the gear teeth resulting in the teeth being 180° out of phase at the location of engagement with one of the planetary gears, is accommodated by forming one of the planetary gears of two identical halves which are welded or otherwise secured together to form a split planetary gear with the teeth of each half 180° out of phase with one another.

The invention will be better understood from the following detailed description and drawings which illustrate a preferred embodiment of the invention.

DESCRIPTION OF THE PREFERRED EMBODIMENT

Figure 1:
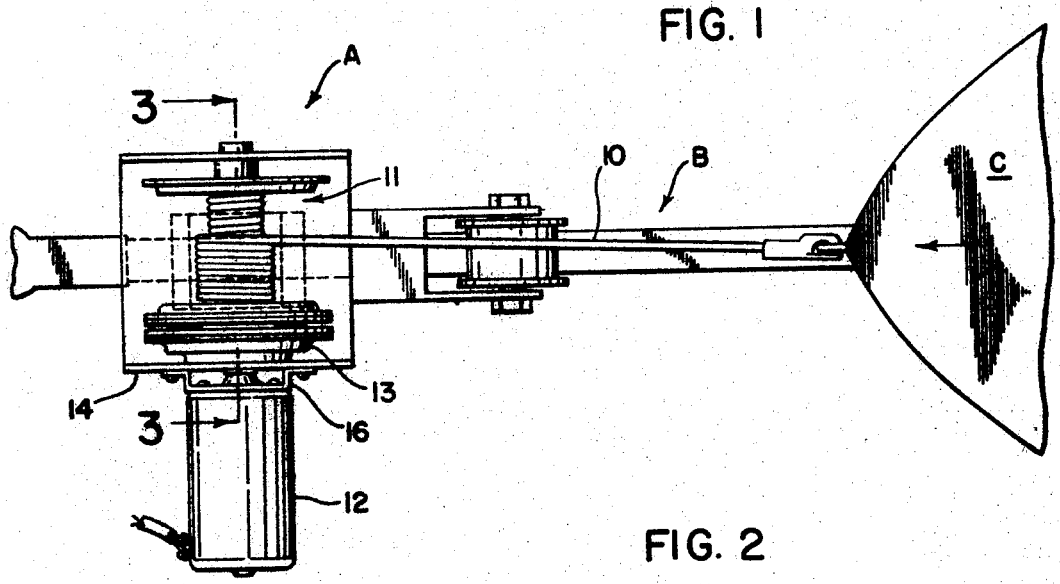
FIGURE 1 is a fragmentary plan view illustrating the operation of a motor driven winch mechanism for a boat trailer utilizing a gear reduction unit embodying the invention.
Figure 2:
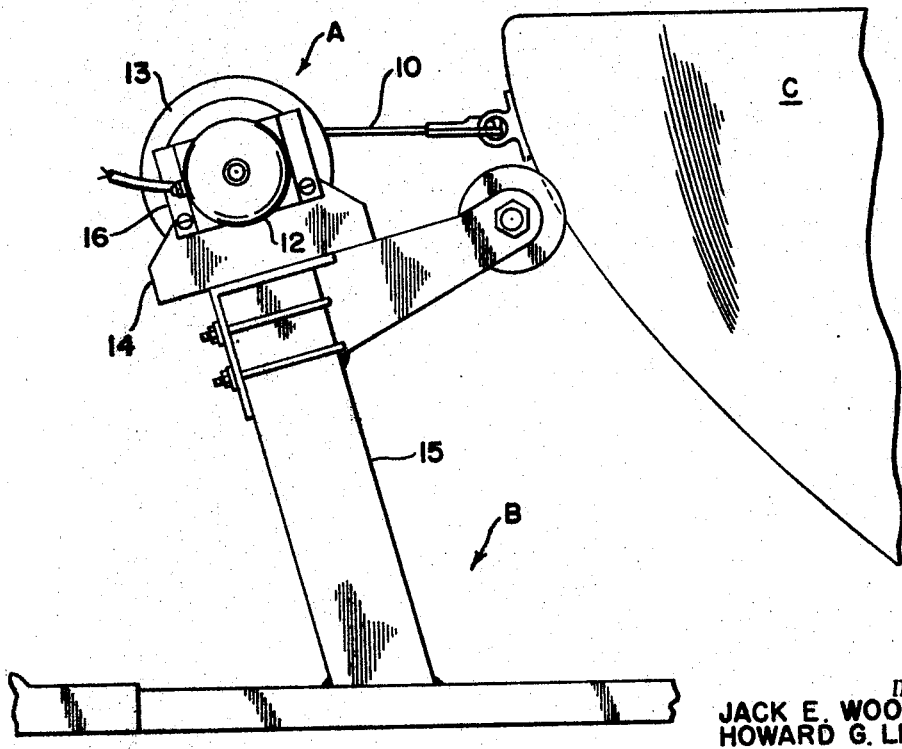
FIGURE 2 is an elevational view similar to FIGURE 1.
Figure 3:
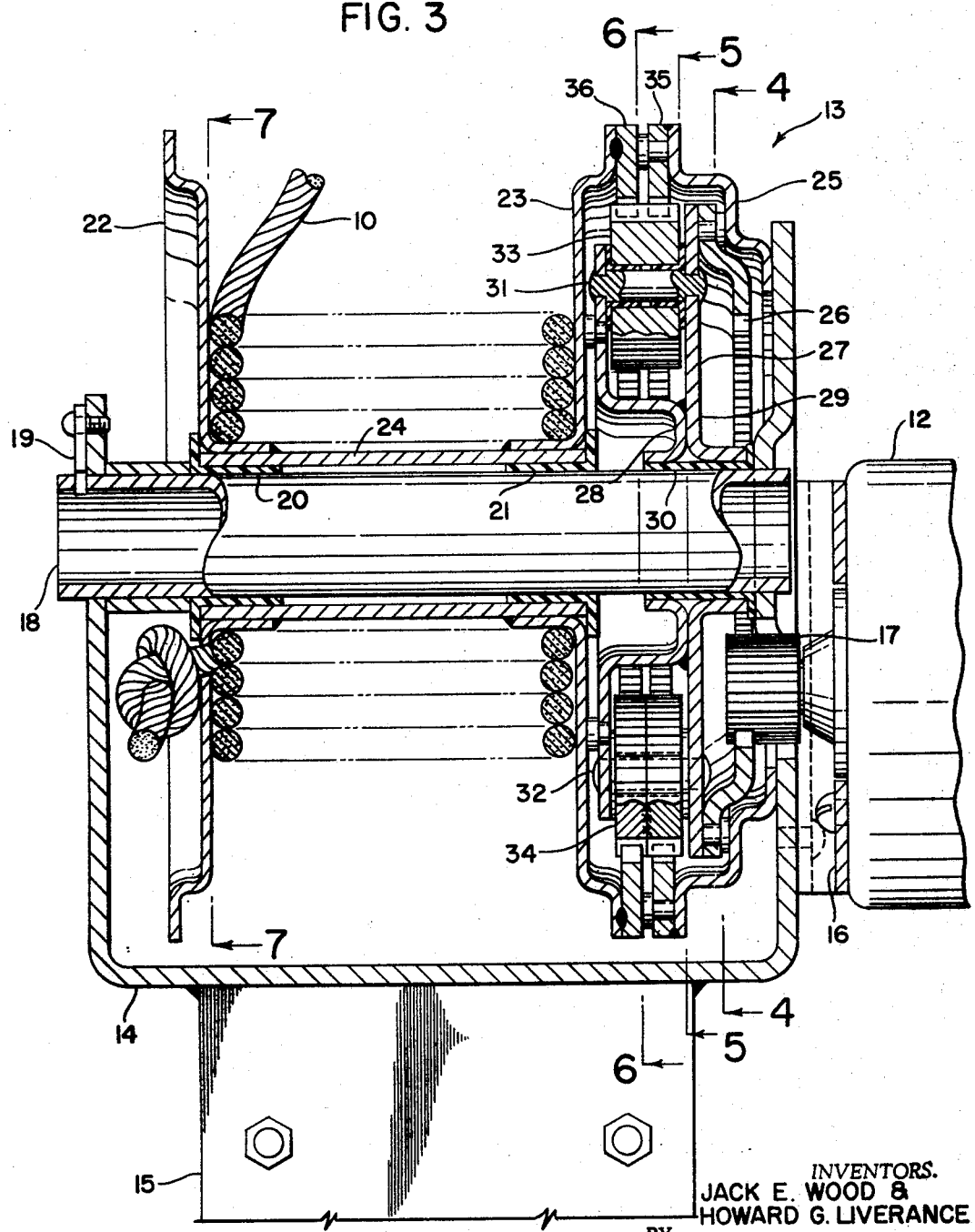
FIGURE 3 is an enlarged sectional view drawn approximately to scale and taken on the line of 3—3 of FIGURE 1.
Figure 4:
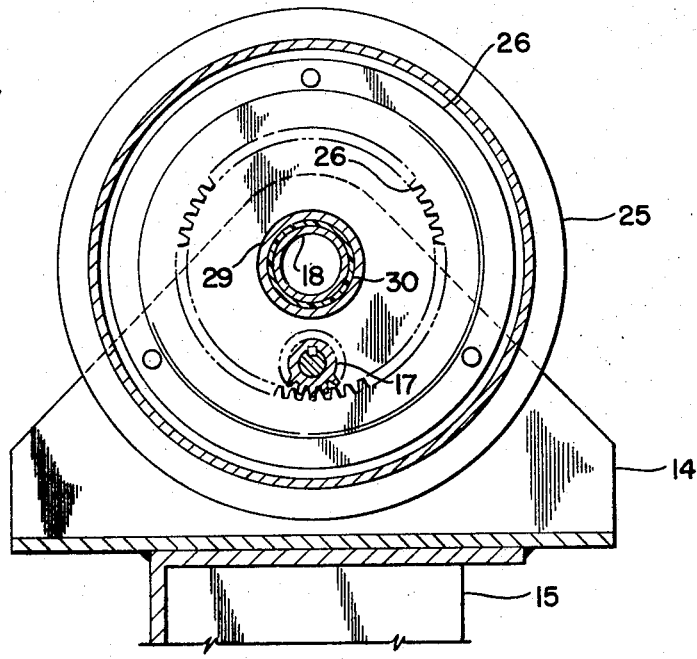
FIGURE 4 is a transverse sectional view on a smaller scale taken on the line 4—4 of FIGURE 3.
Figure 5:
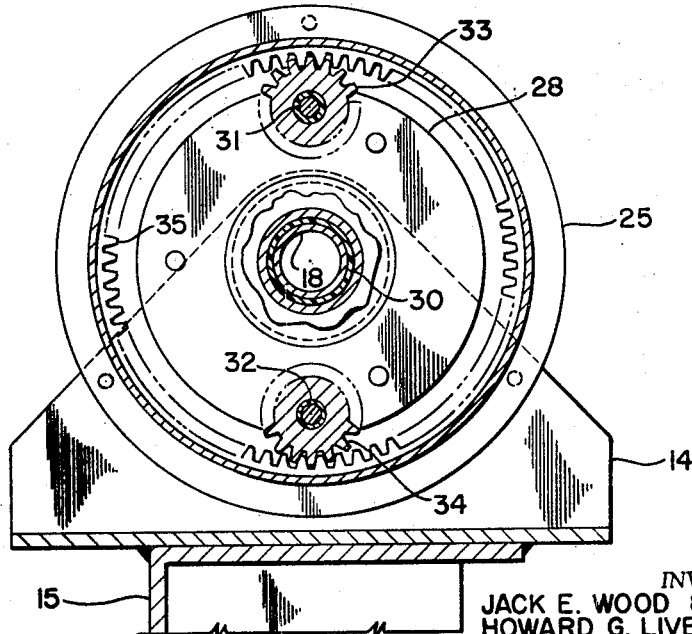
FIGURE 5 is a transverse sectional view drawn to the same scale as FIGURE 4 taken on the line 5—5 of FIGURE 3.
Figure 6:
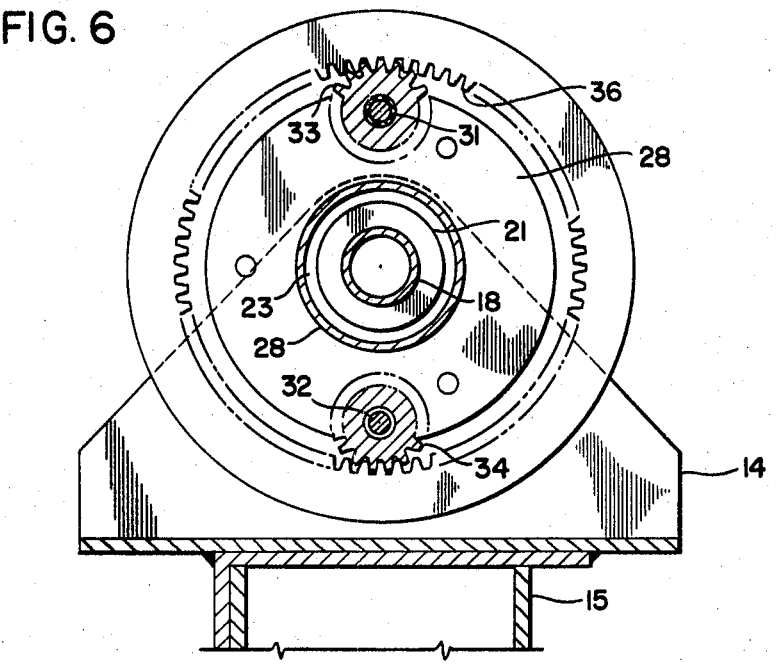
FIGURE 6 is a transverse sectional view drawn to the same scale as FIGURE 4 taken on the line 6—6 of FIGURE 3.
Figure 7:
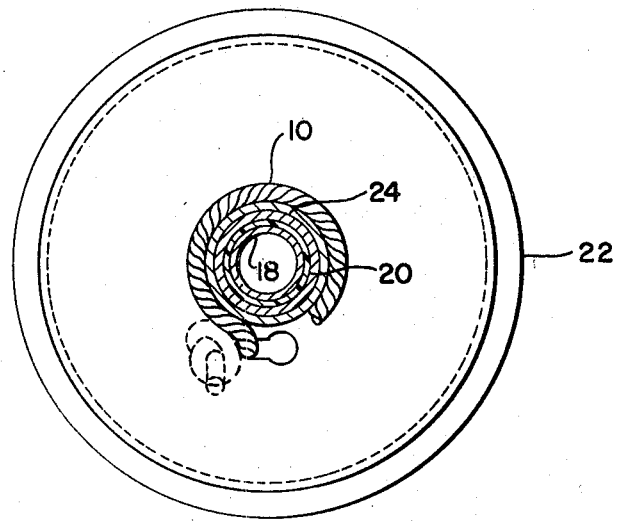
FIGURE 7 is a transverse sectional view drawn to the same scale as FIGURE 4 taken on the line 7—7 of FIGURE 3.

Referring more particularly to the drawings and initially to FIGURES 1 and 2 there is shown a motor driven winch mechanism A mounted on a boat trailer B adapted to carry a boat C which may be pulled from the water to its carrying position on the trailer by a winch rope 10 which is wound on the rope drum 11 of the winch mechanism A. The rope drum 11 is driven by a direct current electrical motor 12 connected to the 12 volt electrical system of the automobile which pulls the trailer B. The electrical connection to the car battery is made through the same electrical lines which are connected from the boat trailer B to the automobile electrical system for operating other trailer accessories such as brake lights and tail lights. The electric motor 12 has a rating of approximately ⅓ horsepower and achieves its maximum power output at about 1700 r.p.m. In order to reduce the speed to a suitable speed for the rope drum 11 a gear reduction unit 13 embodying the invention is connected between the motor 12 and the rope drum 11.

The reduction unit 13 and rope drum 11 are mounted on a fork or bracket 14 bolted to a post 15 on the yoke of the trailer B. The motor 12 is secured to the side of the bracket 14 by a motor mount 16, the motor having an output pinion 17 mounted on its output shaft, which extends through the bracket 14 and into the gear reduction unit 13. The gear reduction unit 13 and the rope drum 11 are supported on a fixed tubular shaft 18 mounted in and extending between the arms of the bracket 14. The shaft is held against rotation by a locking pin 19.

The rope drum 11 turns on the shaft 18 on spaced bushings 20 and 21. The drum is formed of two stamped sheet metal flanges 22 and 23 which are welded on opposite ends of a tubular sleeve 24 which in turn is welded to the bushings 20 and 21.

The gear reduction unit 13 is enclosed between the flange 23 of the rope drum 11 and an annular plate 25 welded to an arm of the bracket 14. The pinion 17 meshes with an internal ring gear 26 which is bolted at its outer margin to a planet carrier 27. The planet carrier 27 comprises two annular plates 28 and 29 welded to one another and welded at their base to a bushing 30 received on the shaft 18.

Mounted on pins 31 and 32 extending between the planet carrier plates 28 and 29 are two planetary gears 33 and 34 located at 180° spacings. The planetary gears shown are preferably cut from extruded stock and have 16 teeth which mesh with a fixed internal ring gear 35 welded to the annular cover plate 25 and also with an output or driven internal ring gear 36 welded to the flange 23 of the rope drum 11. Both internal ring gears 35 and 36 may be stamped from sheet stock.

The fixed internal ring gear 35 has 64 teeth while the output internal ring gear or driven gear has 63 teeth. Accordingly for every revolution of the planet carrier 27, the rope drum will be turned through an arc equal to the spacing of the teeth of the fixed internal ring gear 35 or in other words 5.625°. This provides a gear reduction between the planet carrier and the rope drum of 64:1.

Because the driven internal ring gear 36 has one less tooth than the fixed internal ring gear 35, the teeth thereof will not be aligned with one another at 180° spacings so as to attain proper mesh with the planetary gears 33 and 34. In other words, when the gear teeth of the internal ring gears 35 and 36 are approximately matched at one point they will be 180° out of phase at the opposite point or at the location of the opposite planetary gear. In order to accommodate this situation the planetary gear 33 is formed of two halves which may be cut from the same extruded stock and then welded together with the teeth 180° out of phase with one another. This permits proper mesh for both of the planetary gears. Since the ring gears 35 and 36 are made from stampings and the planetary gears 33 and 34 are cut from extruded gear stock, expensive machining of the gear teeth is eliminated. The same is true of the output pinion 17 and the smaller external ring gear 26.

Many variations in the gear relationships will be apparent to those skilled in the art and the output gear may turn either in the same direction as the planet carrier or in the opposite direction depending upon the differences in ratios.

OPERATION

In the operation of the motor driven winch A according to the particular embodiment shown and described, the boat trailer B having the winch A mounted thereon as shown in FIGURES 1 and 2 and a DC electric motor 12 connected to the automobile electrical system, is backed into the water by the towing vehicle. The winch rope 10 is then connected to the boat C to be loaded on the trailer.

The winch is then operated utilizing a switch on the motor 12 to pull the boat up out of the water and onto the trailer. A winch of the type described using a ⅓ horsepower motor and the gear reduction indicated is capable of handling a boat weighing as much as 1000 lbs. assuming a 15° trailer angle. If the circuit to the motor should for some reason be interrupted sufficient braking will be provided through the gear reduction and the motor itself to prevent the boat from rolling back off of the trailer.

As the motor turns the output pinion 17 turns the internal ring gear 26 with some reduction being achieved, the ring gear 26 in turn turning the planet carrier 27. The planet carrier moves the planetary gears 33 and 34 through an arcuate path of travel in mesh with the fixed ring gear 35 and thus causes the planetary gears 33 and 34 to turn relative to the planet carrier 27. At the same time the planetary gears mesh with the driven or output internal ring gear 36 which due to the difference in number of gear teeth with respect to the fixed ring gear turns through an arc depending upon the center-to-center spacing of the gear teeth of the fixed ring gear. Accordingly for every 64 revolutions of the planet carrier, the driven internal ring gear will turn through one revolution thereby turning the rope drum at a considerably reduced speed.

Although the invention has been shown and described with reference to a specific embodiment thereof this is intended for the purpose of illustration rather than limitation and variations and modifications will become apparent to those skilled in the art within the intent and spirit of the invention as herein specifically illustrated and described. Therefore the patent is not to be limited in the scope and effect to the preferred form shown herein nor in any other way that is inconsistent with the extent to which progress of the art has been advanced by the invention.

We claim:

1. In combination, a boat trailer and a power winch mechanism mounted thereon to pull a floating boat connected to said winch mechanism onto the bed of said boat trailer, said winch mechanism comprising an electric motor, a rope drum, having circular end flanges, a planet carrier operatively connected to said motor, two diametrically spaced planetary gears carried by said planet carrier, a fixed ring gear in mesh with said planetary gear and a driven ring gear circumferentially secured to one of said end flanges of said rope drum said driven ring gear being coaxial with said fixed ring gear and in mesh with said two planetary gears, the ratio of gear teeth of said fixed ring gear to the meshing gear teeth of each of said planetary gears being different than the ratio of gear teeth of said driven ring gear to the meshing gear teeth of each of said planetary gears.

References Cited

UNITED STATES PATENTS 2,548,045 4/1951 Nichols.
2,941,627 6/1960 Beebe _____ 254—186 XR
2,955,487 10/1960 Malley _____ 74—803

ARTHUR T. McKEON, Primary Examiner

U.S. Cl. X.R.

214—517